United States Patent

[11] 3,616,985

| [72] | Inventor | Ulrich Koch |
| | | Hamburg, Germany |
| [21] | Appl. No. | 817,742 |
| [22] | Filed | Apr. 21, 1969 |
| [45] | Patented | Nov. 2, 1971 |
| [73] | Assignee | Ottensener Eisenwerk GmbH |
| | | Hamburg, Germany |
| [32] | Priority | Apr. 20, 1968 |
| [33] | | Germany |
| [31] | | P 17 52 208.6 |

[54] APPARATUS FOR ORIENTING RIMS OF WHEELS FOR AUTOMOTIVE VEHICLES
18 Claims, 3 Drawing Figs.

[52] U.S. Cl. ................................................ 228/18,
29/159.1, 29/208 D, 72/109, 113/127, 219/136,
228/4, 228/48
[51] Int. Cl. ..................................................... B23k 1/00,
B23k 5/00
[50] Field of Search ............................................. 29/208 D,
477.7, 475, 39, 159.1, 481; 72/109; 228/48, 18,
49, 4; 113/113, 127; 269/57; 219/136

[56] References Cited
UNITED STATES PATENTS

| 2,845,038 | 7/1958 | Crawford | 228/49 |
| 2,941,491 | 6/1960 | Knost | 228/49 X |
| 3,091,202 | 5/1963 | Mackey | 29/159.1 X |
| 3,266,702 | 8/1966 | Parent et al. | 228/49 X |

Primary Examiner—John F. Campbell
Assistant Examiner—Victor A. DiPalma
Attorney—Michael S. Striker ABSTRACT: Apparatus for orienting semifinished automobile wheel rims which are formed with radially extending gaps comprises a chute which delivers successive rims into registry with a rotary disk and with a pusher which transfers successively delivered rims into the range of clamping members on the disk. A radially extending pin is thereupon rotated through 360° within the thus clamped rim to enter the gap and to rotate the rim and the disk until the gap is located in a predetermined angular position. The thus oriented rim is thereupon transferred into a welding machine while the angular position of its gap remains unchanged.

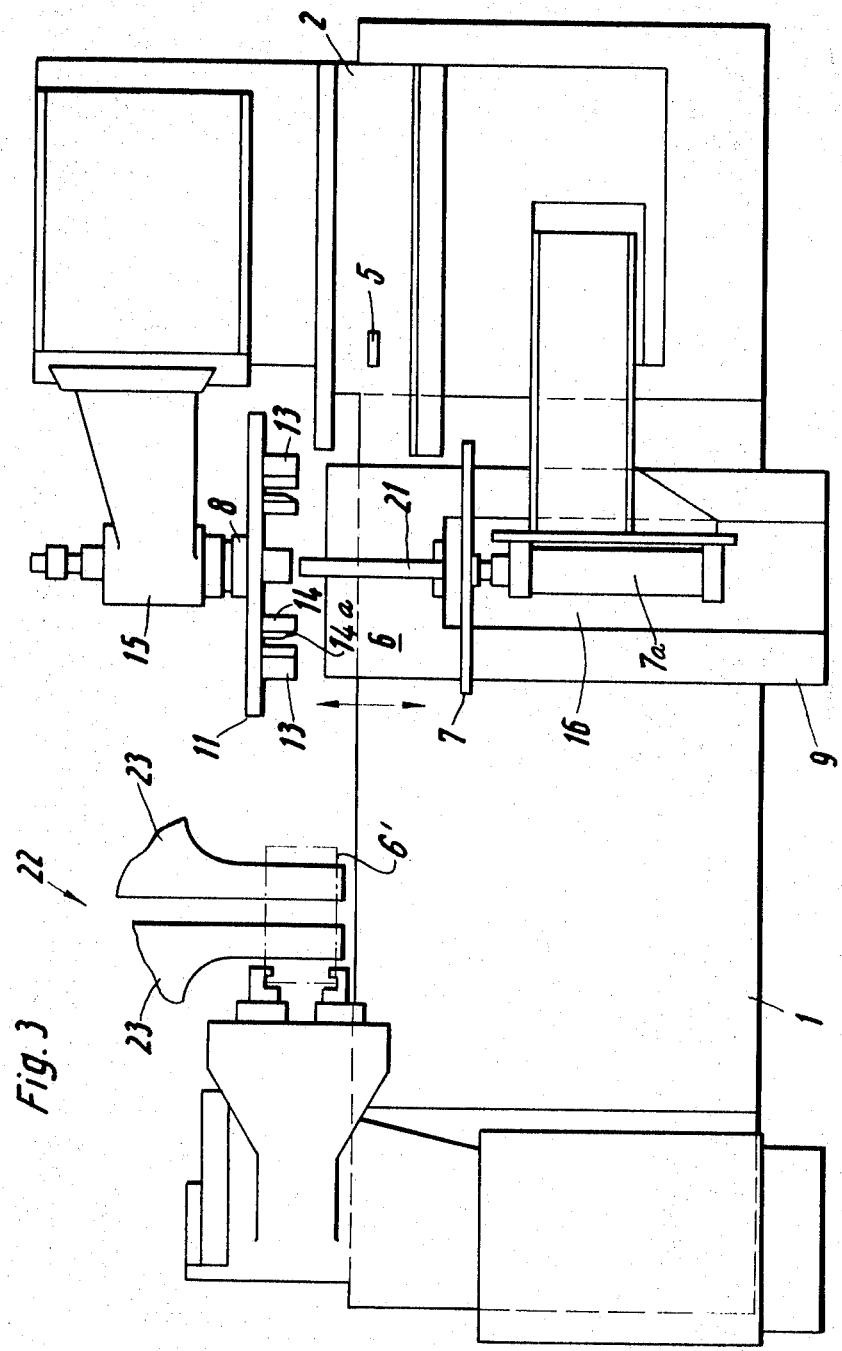

3,616,985

APPARATUS FOR ORIENTING RIMS OF WHEELS FOR AUTOMOTIVE VEHICLES

BACKGROUND OF THE INVENTION

The present invention relates to the production of ring-shaped articles, especially wheels for automotive vehicles, and more particularly to welding of rims for automobile wheels. Still more particularly, the invention relates to a method and apparatus for orienting semifinished rims prior to and during introduction into a welding station.

It is known to produce rims for the wheels of automotive vehicles by suitable deformation of a strip of metallic material and by thereupon welding the ends of the resulting split ring to each other to convert the split ring into a circumferentially complete ring-shaped article. Prior to welding, the gap between the ends of the split ring must be placed in a predetermined angular position to make sure that such gap is properly oriented with reference to the electrodes of a butt-welding machine or the like. At the present time, orientation of partly finished rims is carried out by hand which is a time-consuming procedure and is inconsistent with automated operation of the remaining machines or apparatus which are employed in mass-production of wheels for automotive vehicles.

SUMMARY OF THE INVENTION

An object of my invention is to provide a novel method of automatically or semiautomatically orienting semifinished articles, particularly semifinished automobile wheel rims, in such a way that the gaps or slots of such articles are located in predetermined angular positions.

Another object of this invention is to provide a method according to which the width of each gap is fixed prior to completed orientation of the respective article.

A further object of the invention is to provide an apparatus for manipulating semifinished rims or like ring-shaped articles to insure that the width of the gap on each article is within a desired range before the article is transferred to a further processing station, preferably to a butt welding machine which provides the article with a seam extending along the gap to thus convert the article into a circumferentially complete rim which is ready to be assembled with a disk to constitute a tire-supporting wheel for use in automotive vehicles or the like.

An additional object of the invention is to provide the apparatus with novel transporting, orienting and conveying means capable of insuring rapid, accurate and reproducible orientation of successively delivered semifinished rims.

Still another object of the invention is to provide the apparatus with novel means for supplying semifinished rims or like ring-shaped articles to an orienting station where the gaps of successively delivered rims are moved to predetermined angular positions prior to transfer of rims to the welding machine.

The method of my invention is employed for manipulation of ring-shaped articles, particularly of semifinished wheel rims of the type having a gap or slot located in a radial plane. The method comprises the steps of orienting successive articles at a first station by rotating the articles about their axes to move the gaps to a predetermined angular position, and thereupon transferring the thus oriented articles to a second station, preferably to a station where the articles are provided with welded seams extending along their respective gaps so that the articles are converted into circumferentially complete ring-shaped bodies.

The transferring step preferably includes maintaining the gaps of articles in unchanged angular positions during movement of articles from the first to the second station. The method preferably further includes the step of deforming successive articles radially at the first station so that the width of their gaps in the predetermined angular positions of gaps is within a preselected range. Such width is thereupon maintained during transfer of articles to the second station and during welding and/or other treatment at the second station.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a plan view of the apparatus.

DESCRIPTION OF THE PREFERRED EMBODIMENTS

Figure 1:
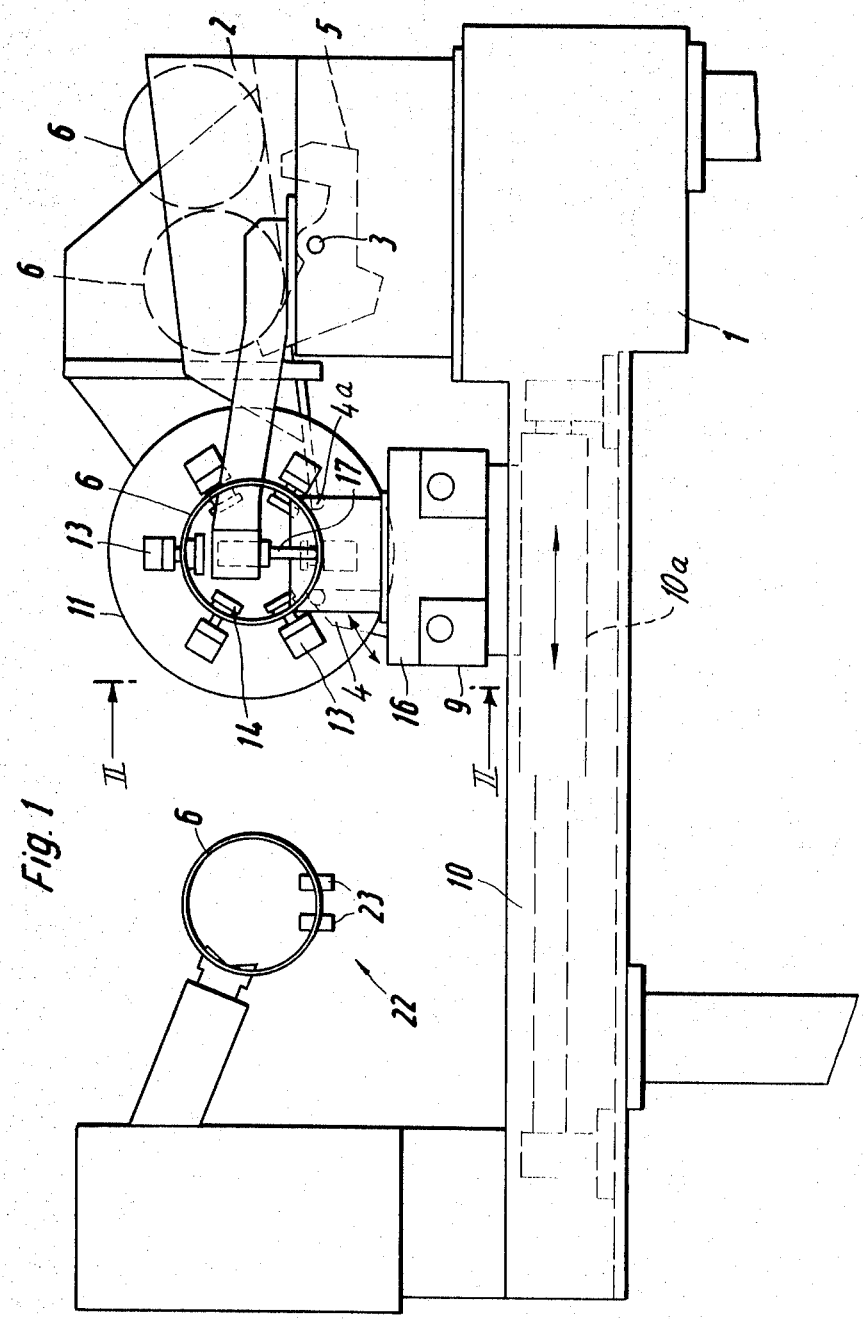
FIG. 1 is a fragmentary schematic elevational view of an orienting apparatus which embodies the invention.
Figure 2:
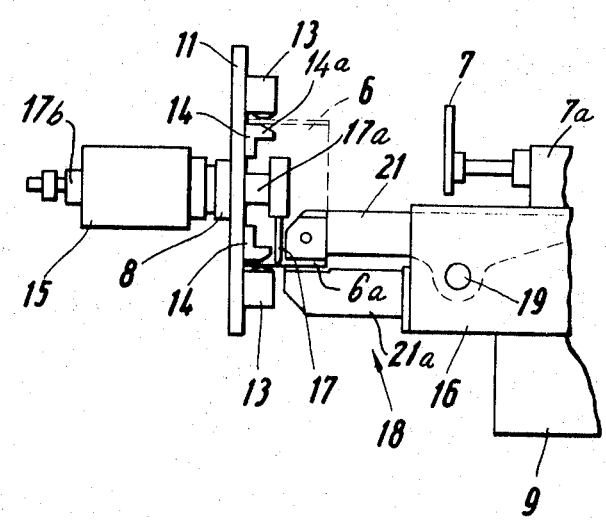
FIG. 2 is a view as seen in the direction of arrows from the line II—II of FIG. 1.

The orienting apparatus comprises a frame or main support 1 which mounts a feeding conveyor having a downwardly inclined chute 2 cooperating with a stop 5 which is pivotable on a horizontal pin 3 and serves to control the delivery of successive semifinished rims 6 into registry with a reciprocable transfer member 7. The rims 6 resemble split rings and are supplied to the chute 2 from a deforming station, not shown, by a conveyor or the like. The aforementioned transfer member 7 is a pusher or plunger which is reciprocable by a hydraulic or pneumatic drive including a cylinder and piston unit 7a mounted on the frame 1 (see FIGS. 2 and 3). This pusher 7 moves the foremost rim 6 sideways (i.e., axially) against the adjacent front face of a disk-shaped carried 11 which is rotatable about the axis of a hollow horizontal shaft 8. The front face of the carrier 11 is provided with angularly spaced outer and inner clamping or retaining members 13, 14. As shown in FIG. 2, the inner clamping members 14 are provided with inclined deforming or spreading surfaces 14a along which the internal surface of the rim 6 slides during travel toward the front face of the carrier 11 whereby the rim is caused to expand and to develop a gap or slot 6a (FIG. 1) located in a radial plane of the expanded rim. The carrier 11 is adjustable with reference to the chute 2, preferably in a direction to the left or to the right, as viewed in FIG. 1 or 3. FIG. 3 shows a slide 15 which supports the carrier 11 for movement with reference to the frame 1. When an expanded or deformed rim 6 abuts against or is closely adjacent to the front face of the carrier 11, the width of its gap 6a is within a predetermined range. At least some of the clamping members 13, 14 are movable with reference to each other and with reference to the carrier 11 by suitable mechanical, magnetic, pneumatic or hydraulic means (not shown) to properly hold the expanded rim 6 for rotation with the carrier. The pusher 7 is thereupon retracted and the rim 6 on the carrier 11 is engaged by a radially extending pin-shaped motion transmitting or orienting member 17 whose shaft 17a extends axially through the hollow shaft 8 and into the interior of the rim 6 which is held by the clamping members 13 and 14. The means for moving the shaft 17a of the orienting member 17 comprises a pneumatic or hydraulic cylinder 17b. The tip of the member 17 is movable radially of the shaft 17a and is based outwardly, i.e., against the internal surface of the rim 6 which is held by the clamping members 13, 14. Means is provided to rotate the member 17 through an angle of 360° whereby the tip of the member 17 penetrates into the gap 6a of the rim 6 and thereupon rotates the rim with the carrier 11 until it returns to starting position. Consequently, the gap 6a of the rim 6 is then located in a predetermined angular position which is best suited for subsequent manipulation of the rim during transfer to the welding station.

The frame 1 further supports a first carriage 9 which is reciprocable along tie rods 10 by a mechanical, hydraulic or pneumatic drive 10a and carries a second carriage 16 for a pincerlike or tonglike gripping device 18. The tie rods 10 extend at right angles to the axis of the carrier 11 and are located in a horizontal plane. The carriage 16 is movable relative to the carriage 9 in parallelism with the axis of the carrier 11. The gripping device 18 has an upper arm or holder 21 which is turnable about a horizontal pivot 19. When the holder 21 is pivoted upwardly and away from the fixed lower holder 21a (see FIG. 2), the gripping device 18 can be moved by the carriage 16 to the position shown in FIG. 2 whereupon its holder 21 pivots in a direction to engage the oriented rim 6 and to press it against the holder 21a. The carriage 16 is thereupon withdrawn in a direction away from the carrier 11 to disengage the oriented rim 6 from the clamping members 13, 14, and the carriage 9 is moved in a direction to the left, as viewed in FIG. 3, to move the oriented rim 6 into proper position with reference to the electrodes 23 of a welding machine 22. The arrangement is preferably such that the clamping members 13, 14 are automatically disengaged from the oriented rim 6 when the latter is properly engaged by the holders 21, 21a of the gripping device 18. The final position 6' of the rim 6 at the welding station is selected in such a way that the gap 6a is located exactly midway between the electrodes 23. The means for removing the finished circumferentially complete rim from the welding machine preferably comprises a suitable conveyor, not shown. The conveyor can transport the finished rim to an apparatus of the type disclosed in the copending application, Ser. No. 810,586, filed Mar. 26, 1969 of Seidwitz which is assigned to the same assignee.

In the illustrated embodiment, the starting position of the orienting member 17 is selected in such a way that the member 17 extends vertically downwardly. Thus, when a properly oriented rim 6 leaves the orienting station which is occupied by the carrier 11, the gap 6a is located at the lowermost point of the rim in a vertical plane which includes the axis of the shaft 8. It is clear, however, that this is just one of several starting positions in which the orienting member 17 can be held prior to movement of its tip into engagement with the gap 6a of a freshly delivered rim 6.

It is further clear that the apparatus of my invention is provided with a suitable programming system which triggers the operation of various movable parts so that the rims 6 are automatically advanced from the chute 2 to the welding machine 22 and from the welding machine to further processing stations. Such programming system controls intermittent movements of the stop 5 to and from blocking position, movements of the pusher 7 toward and away from the carrier 11, rotation of the orienting member 17 through angles of 360°, movements of the carriage 9 with reference to the frame 1, movements of the carriage 16 with reference to the carriage 9, movements of the holder 21 with reference to the holder 21a, and movements of some or all of the clamping members 13, 14 with reference to the carrier 11.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. In an apparatus for manipulating ring-shaped articles, particularly semifinished wheel rims of the type having a gap located in a radial plane, a combination comprising rotary carrier means provided with article retaining means; feeding means for supplying articles into registry with said carrier means; and transfer means for delivering articles supplied by said feeding means into the range of said retaining means so that the thus delivered articles are engaged by said retaining means and can rotate with said carrier means, said transfer means comprising a pusher reciprocable in the axial direction of said carrier means and fluid-operated drive means for reciprocating said pusher.

2. A combination as defined in claim 1, wherein said feeding means comprises a chute and intermittently actuated stop means cooperating with said chute to effect movements of successive articles into registry with said carrier means.

3. A combination as defined in claim 2, wherein said feeding means comprises a conveyor for articles and intermittently pivotable stop means cooperating with said conveyor to permit movements of successive articles into axial alignment with said carrier means.

4. A combination as defined in claim 1, further comprising orienting means rotatable about the axis of said carrier means from and back to a predetermined starting position and having a portion arranged to enter the gap of an article which is engaged by said retaining means and to thereby move the gap of such article to a predetermined angular position in response to movement of said orienting means to starting position.

5. In an apparatus for manipulating ring-shaped articles, particularly semifinished wheel rims of the type having a gap located in a radial plane, a combination comprising rotary carrier means provided with article retaining means; feeding means for supplying articles into registry with said carrier means; and transfer means for delivering articles supplied by said feeding means into the range of said retaining means so that the thus delivered articles are engaged by said retaining means and can rotate with said carrier means, said retaining means comprising clamping means operative to effect deformation of articles delivered by said transfer means so that the width of gaps defined by the thus deformed articles is within a predetermined range.

6. A combination as defined in claim 5, wherein said feeding means comprises a chute and intermittently actuated stop means cooperating with said chute to effect movements of successive articles into registry with said carrier means.

7. A combination as defined in claim 5, wherein said feeding means comprises a conveyor for articles and intermittently pivotable stop means cooperating with said conveyor to permit movements of successive articles into axial alignment with said carrier means.

8. A combination as defined in claim 5, further comprising orienting means rotatable about the axis of said carrier means from and back to a predetermined starting position and having a portion arranged to enter the gap of an article which is engaged by said retaining means and to thereby move the gap of such article to a predetermined angular position in response to movement of said orienting means to said starting position.

9. In an apparatus for manipulating ring-shaped articles, particularly semifinished wheel rims of the type having a gap located in a radial plane, a combination comprising rotary carrier means provided with article retaining means; feeding means for supplying articles into registry with said carrier means; and transfer means for delivering articles supplied by said feeding means into the range of said retaining means so that the thus delivered articles are engaged by said retaining means and can rotate with said carrier means, said retaining means comprising sets of inner and outer clamping members arranged to engage the inner and outer surfaces of an article delivered by said transfer means, at least some of said clamping members being movable with reference to said carrier means into and away from engagement with the corresponding surface of an article.

10. A combination as defined in claim 9, wherein the clamping members of one of said sets are provided with means for deforming articles delivered by said transfer means so that the width of gaps on the thus deformed articles is within a predetermined range.

11. A combination as defined in claim 10, wherein said one set includes said inner clamping members and wherein said means for deforming includes inclined faces provided on said inner clamping members.

12. In an apparatus for manipulating ring-shaped articles, particularly semifinished wheel rims of the type having a gap located in a radial plane, a combination comprising rotary disk-shaped carrier means provided with article retaining means; feeding means for supplying articles into registry with said carrier means, said carrier means being adjustable with reference to said feeding means; and transfer means for delivering articles supplied by said feeding means into the range of said retaining means so that the thus delivered articles are engaged by said retaining means and can rotate with said carrier means.

13. In an apparatus for manipulating ring-shaped articles, particularly semifinished wheel rims of the type having a gap located in a radial plane, a combination comprising rotary carrier means provided with article retaining means; feeding means for supplying articles into registry with said carrier means; transfer means for delivering articles supplied by said feeding means into the range of said retaining means so that the thus delivered articles are engaged by said retaining means and can rotate with said carrier means; and orienting means rotatable through 360° about the axis of said carrier means from and back to a predetermined starting position and having a portion arranged to enter the gap of an article which is engaged by said retaining means and to thereby move the gap of such article to a predetermined angular position in response to movement of said orienting means to said starting position, said portion of said orienting means being arranged to rotate said carrier means by way of an article which is engaged by said retaining means while said portion of said orienting means extends into the gap of such article and the orienting means rotates toward said starting position.

14. A combination as defined in claim 13, wherein said carrier means comprises a hollow shaft and said orienting means extends axially through said shaft.

15. In an apparatus for manipulating ring-shaped articles, particularly semifinished wheel rims of the type having a gap located in a radial plane, a combination comprising rotary carrier means provided with article retaining means; feeding means for supplying articles into registry with said carrier means; transfer means for delivering articles supplied by said feeding means into the range of said retaining means so that the thus delivered articles are engaged by said retaining means and can rotate with said carrier means; orienting means rotatable about the axis of said carrier means from and back to a starting position and having a portion arranged to enter the gap of an article which is engaged by said retaining means and to thereby move the gap of such article to a predetermined angular position in response to movement of said orienting means to said starting position; a processing machine spaced from said carrier means; and carriage means for transporting articles from said carrier means to said processing machine while holding the gaps of such articles in said predetermined angular positions.

16. A combination as defined in claim 15, wherein said carriage means comprises a first carriage movable at right angles to the axis of said carrier means and a second carriage movable with reference to said first carriage in the axial direction of said carrier means, one of said carriages being supported by the other carriage and said one carriage having article gripping means.

17. A combination as defined in claim 16, wherein said gripping means comprises a first holder fixedly secured to said one carriage and a second holder pivotably secured to said one carriage and movable with reference to said first holder to respectively grip or release an oriented article a portion of which is located between said holders.

18. A combination as defined in claim 15, wherein said processing machine is a welding machine arranged to weld oriented articles along the respective gaps.